No. 700,551. Patented May 20, 1902.
N. F. PALMER.
MACHINE FOR MOLDING ARTIFICIAL STONE.
(Application filed Feb. 14, 1902.)
(No Model.) 5 Sheets—Sheet 1.

FIG. I.

Witnesses:
Arthur Lunys.
William Schulz.

Inventor:
Noyes F Palmer
by his attorneys
Roeder & Briesen

No. 700,551. Patented May 20, 1902.
N. F. PALMER.
MACHINE FOR MOLDING ARTIFICIAL STONE.
(Application filed Feb. 14, 1902.)

(No Model.) 5 Sheets—Sheet 3.

Witnesses:
Arthur Tunys.
William Schulz.

Inventor:
Noyes F. Palmer
by his attorneys
Roeder & Friesen

No. 700,551. Patented May 20, 1902.
N. F. PALMER.
MACHINE FOR MOLDING ARTIFICIAL STONE.
(Application filed Feb. 14, 1902.)

(No Model.) 5 Sheets—Sheet 4.

Witnesses:
Arthur Lump.
William Schulz.

Inventor:
Noyes F. Palmer
by his attorneys
Roeder & Briesen

No. 700,551. Patented May 20, 1902.
N. F. PALMER.
MACHINE FOR MOLDING ARTIFICIAL STONE.
(Application filed Feb. 14, 1902.)
(No Model.) 5 Sheets—Sheet 5.
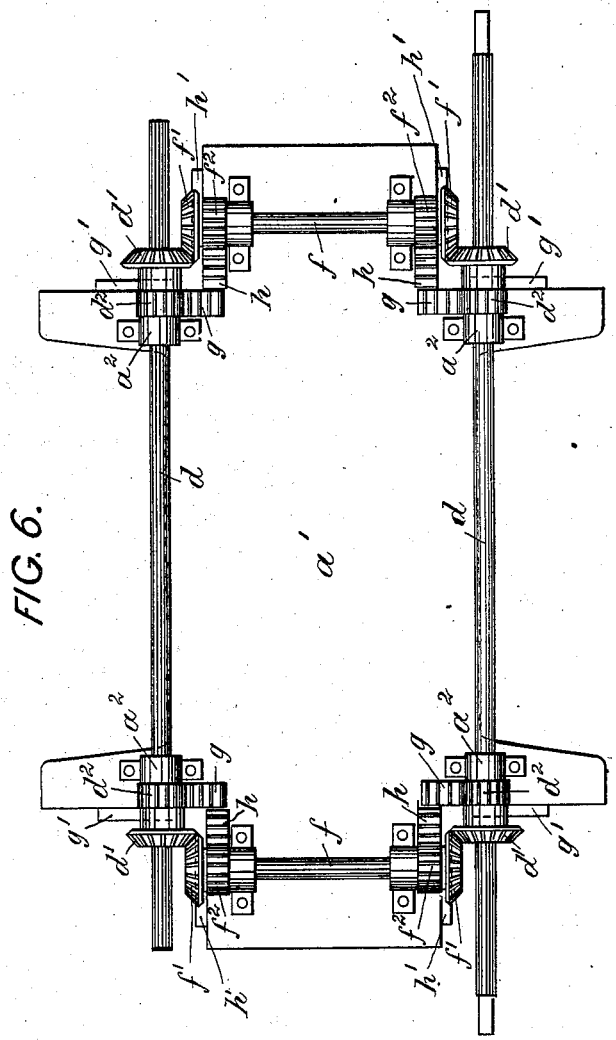

UNITED STATES PATENT OFFICE.

NOYES F. PALMER, OF BROOKLYN, NEW YORK.

MACHINE FOR MOLDING ARTIFICIAL STONE.

SPECIFICATION forming part of Letters Patent No. 700,551, dated May 20, 1902.

Application filed February 14, 1902. Serial No. 94,013. (No model.)

*To all whom it may concern:*

Be it known that I, NOYES F. PALMER, a citizen of the United States, and a resident of Brooklyn, county of Kings, and State of New York, have invented certain new and useful Improvements in Machines for Molding Artificial Stone, of which the following is a specification.

This invention relates to a machine for molding concrete artificial building and paving blocks of the class in which the mold-box has sliding sides by means of which the molded block may be released.

The invention consists more particularly in novel mechanism for imparting the sliding movement to the sides of the mold-box, so that the latter may be expanded and contracted uniformly and in a simple manner.

The invention also consists in the various other features of construction pointed out in the claims.

Figure 1:
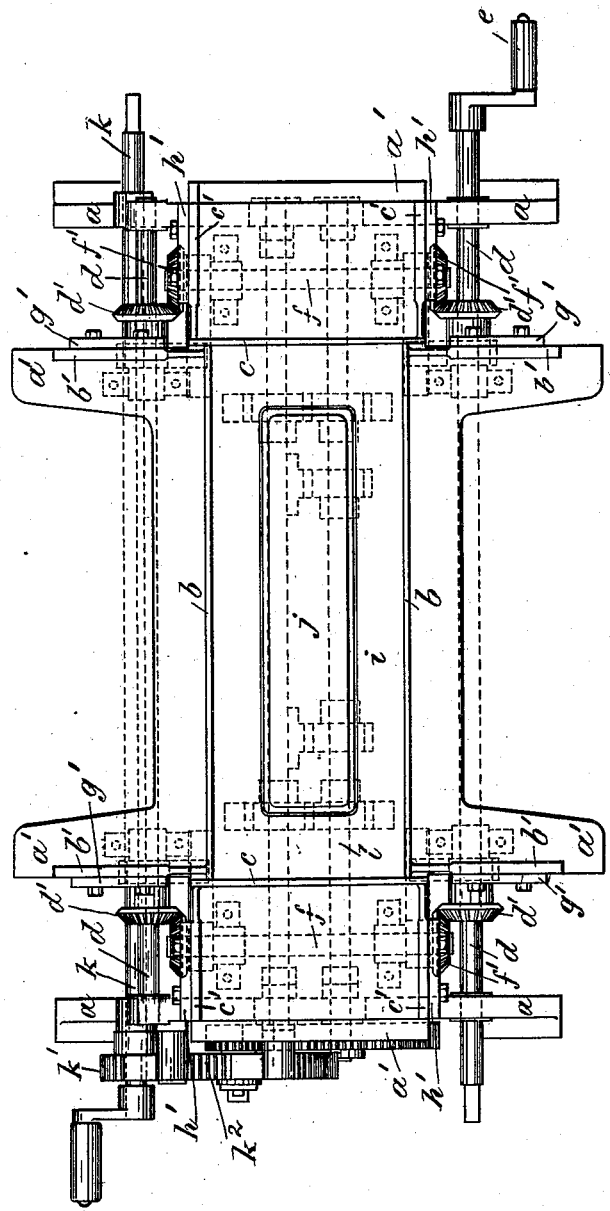
Figure 2:
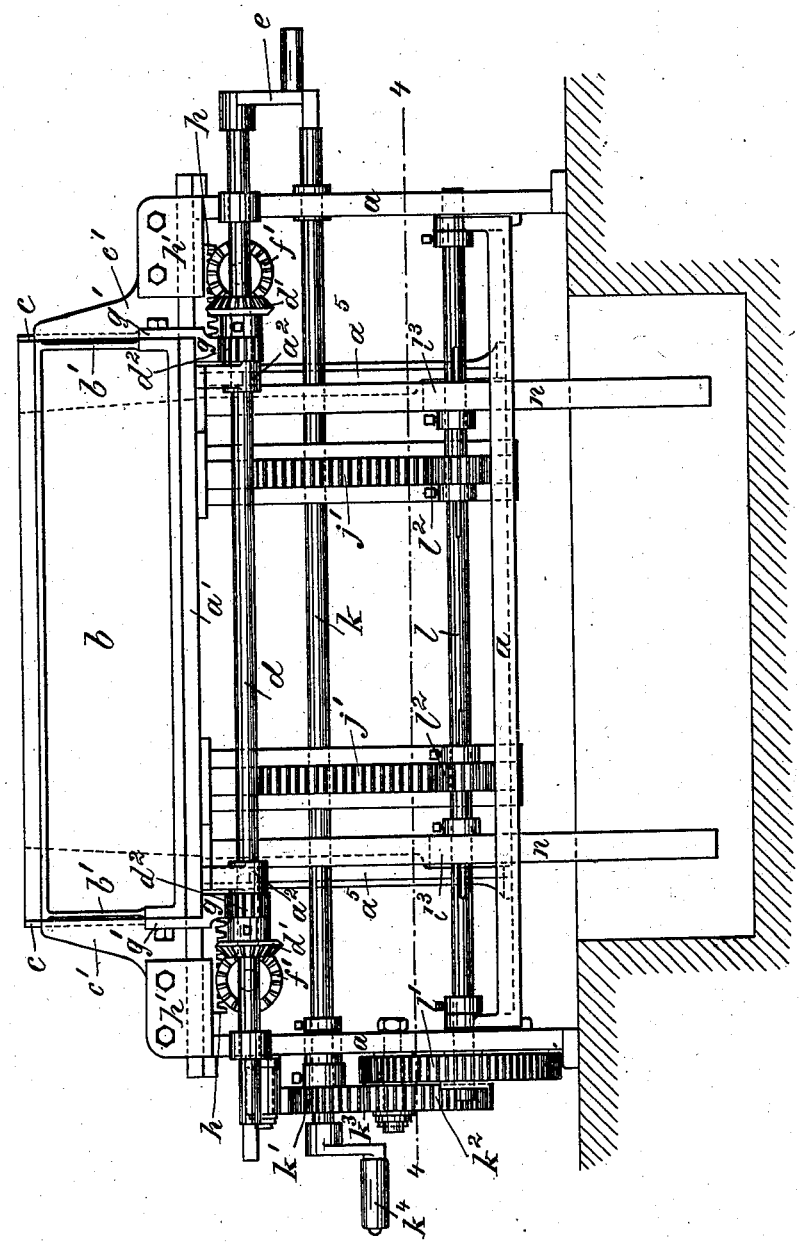
Figure 3:
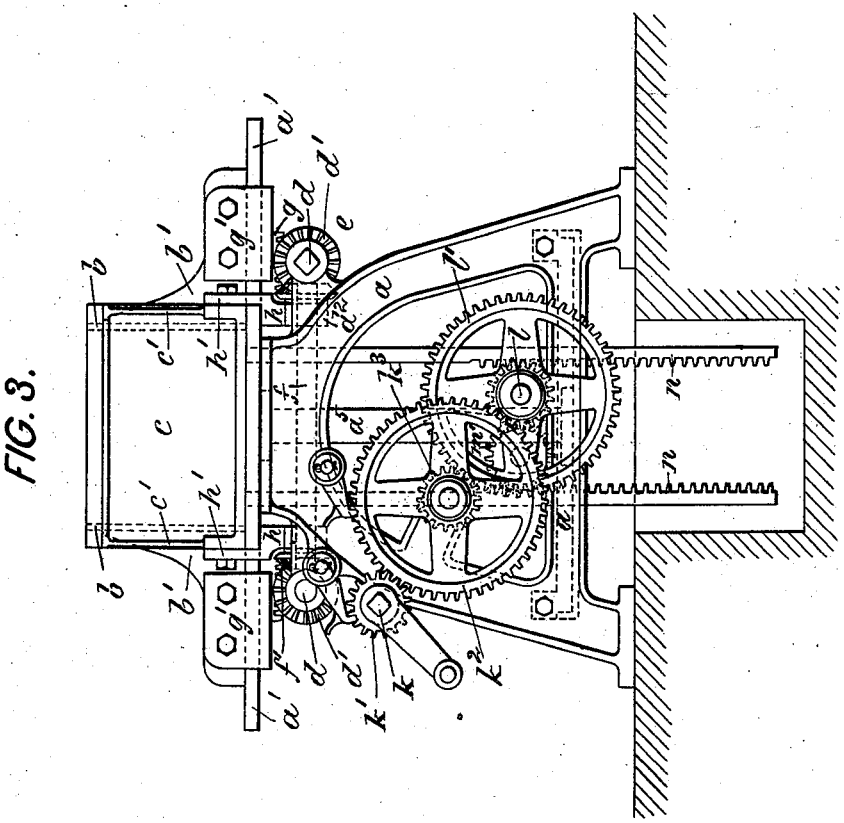
Figure 4:
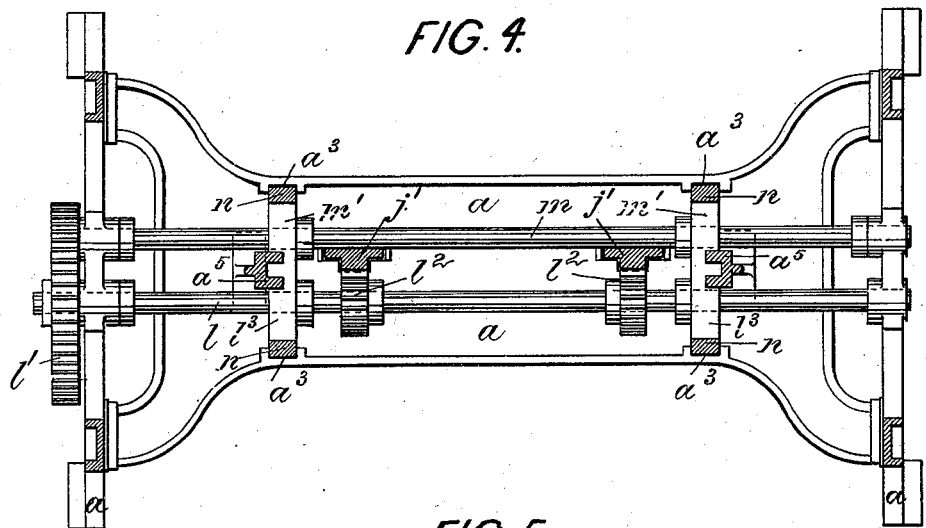
Figure 5:
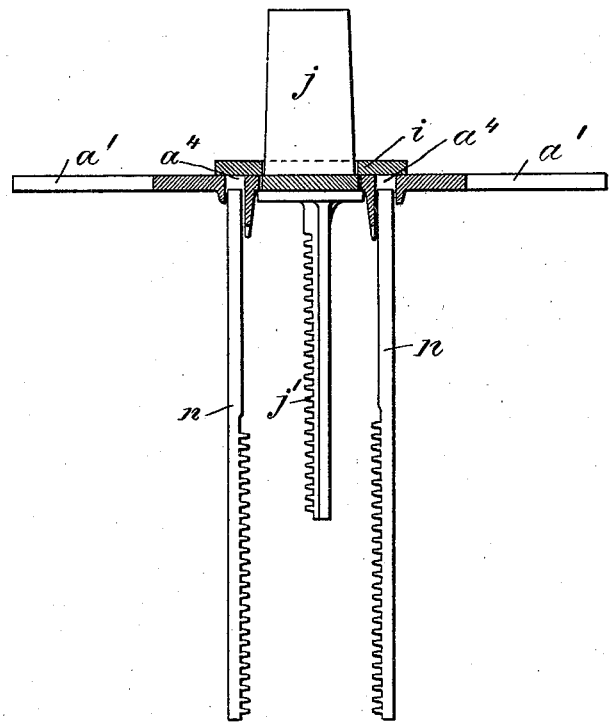

In the accompanying drawings, Figure 1 is a plan of my improved machine; Fig. 2, a front elevation; Fig. 3, an end elevation; Fig. 4, a horizontal section on line 4 4, Fig. 2; Fig. 5, a detail of the racks $n$ $j'$, and Fig. 6 a detail of the racks and pinions (looking upward) for setting the mold-box.

The letter $a$ represents the frame of the machine, supporting the bed-plate $a'$, upon which are free to slide the side plates $b$ and the end plates $c$ of the mold-box, which is usually of rectangular form. This sliding movement of the plates $b$ $c$ serves to release the molded block and also to permit an adjustment of the mold to different sizes of blocks.

Movement is imparted to the plates $b$ and $c$ in the following manner: $d$ $d$ are a pair of longitudinal shafts hung in bearings $a^2$ of frame $a$, one of said shafts being provided with a squared end to receive a crank-handle $e$. The longitudinal shafts $d$ are intergeared by bevel-gear $d'$ $f'$, Figs. 1 and 6, with two transverse shafts $f$, the four shafts being thus simultaneously rotated and forming a rectangle. This rectangle is arranged concentric to the mold-box, Fig. 1, the arrangement and number of shafts corresponding to the arrangement and number of the sides $b$ and ends $c$. Each shaft $d$ carries two pinions $d^2$, meshing into racks $g$ of guides $g'$, bolted to ribs $b'$ of plates $b$. In like manner each of the shafts $f$ carries two pinions $f^2$, meshing into racks $h$ of guides $h'$, bolted to ribs $c'$ of plates $c$. The racks $h$ and $g$ extend at right angles to each other.

By the rotation of the handle $e$ and the consequent simultaneous rotation of the four shafts $d$ $d$ $f$ $f$ the pinions $d^2$ $f^2$ will move the racks $g$ $h$ outward or inward for the same distance, and thus the mold-box will be uniformly expanded or contracted. The guides $g'$ $h'$ engage the edges of the base-plate $a'$ and serve to impart a proper rectilinear movement to the plates $b$ and $c$.

Within the mold-box is fitted a vertically-movable false bottom $i$, by which the molded block is lifted to clear the mold-box. The false bottom $i$ as well as the base-plate $a'$ are perforated to accommodate one or more vertically-movable cores $j$, used in the manufacture of hollow blocks, and guided in rails $a^5$. These cores are lowered while the false bottom is being raised in order to liberate the molded block and permit its ready removal.

The mechanism for imparting motion to the false bottom and the core is as follows: $k$ is a crank-shaft having handle $k^4$ and rotating a longitudinal shaft $l$ by gearing $k'$ $k^2$ $k^3$ $l'$. The shaft $l$ carries two pinions $l^2$ and two pinions $l^3$. The pinions $l^2$ engage racks $j'$, depending from core $j$, and thus serve to raise or lower the core. To adjust the movement of the core, the pinions $l^2$ $l^2$ are longitudinally movable on shaft $l$ by groove and feather, so as to become disengaged from the racks $j'$ and to reëngage therewith after the racks have been differently set. The pinions $l^3$ are intergeared with pinions $m'$ of a longitudinal shaft $m$, arranged parallel to shaft $l$. Each of the four pinions $l^3$ $m'$ engages with its outermost teeth a rack $n$, so that the four racks are simultaneously raised or lowered. The racks are guided in grooves $a^3$ of frame $a$, Fig. 4, and pass through perforations $a^4$ of base-plate $a'$ in order to operatively engage the false bottom $i$. As the shaft $k$ is rotated it will thus lower the core $j$ by racks $j'$ and will simultaneously elevate the false bottom $i$ by racks $n$.

In use the concrete is tamped into the mold-box and is struck off. The handle $e$ is then turned to open the mold, and subsequently the handle $k^4$ is operated to raise the molded block out of the mold and simultaneously withdraw the core.

It will be seen that by my invention the various parts of the mold-box are quickly, positively, and uniformly operated, so that a uniform product is obtained and the output of the machine is increased.

What I claim is—

1. In a machine for molding artificial stone, the combination of a mold-box having sliding sides and ends, with a series of intergeared shafts corresponding in number to the number of mold-box sides and ends, and with racks and pinions for transmitting motion from the shafts to said sides and ends, substantially as specified.

2. In a machine for molding artificial stone, the combination of a mold-box having sliding sides and ends, with a series of intergeared shafts arranged concentric to the mold-box, pinions mounted upon said shafts, racks engaged by the pinions, and means for connecting said racks to the sliding sides and ends, substantially as specified.

3. In a machine for molding artificial stone, the combination of a rectangular mold-box having sliding sides and ends, with four intergeared shafts arranged in a rectangle concentric to said mold-box, pinions mounted upon said shafts, two series of racks engaged by said pinions and extending at right angles to each other, and means for connecting said racks to the sliding sides and ends, substantially as specified.

Signed by me at New York city, county and State of New York, this 13th day of February, 1902.

NOYES F. PALMER.

Witnesses:
WILLIAM SCHULZ,
F. V. BRIESEN.